United States Patent
Sollich et al.

(10) Patent No.: US 11,416,392 B2
(45) Date of Patent: Aug. 16, 2022

(54) ARENA-BASED MEMORY MANAGEMENT

(71) Applicant: Microsoft Technology Licensing, LLC, Redmond, WA (US)

(72) Inventors: Peter Franz Valentin Sollich, Bavaria (DE); Robert Lovejoy Goodwin, Mercer Island, WA (US); Charles Ryan Salada, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/447,790

(22) Filed: Jun. 20, 2019

(65) Prior Publication Data

US 2020/0401517 A1 Dec. 24, 2020

(51) Int. Cl.
*G06F 12/02* (2006.01)
*G06F 12/0815* (2016.01)

(52) U.S. Cl.
CPC ...... *G06F 12/0276* (2013.01); *G06F 12/0815* (2013.01); *G06F 2212/1044* (2013.01)

(58) Field of Classification Search
None
See application file for complete search history.

(56) References Cited

U.S. PATENT DOCUMENTS

| 6,799,191 | B2 | 9/2004 | Agesen et al. |
| 7,310,718 | B1 | 12/2007 | Liang et al. |
| 7,937,419 | B2 | 5/2011 | Ylonen |
| 8,250,121 | B2 | 8/2012 | Daynes et al. |
| 9,128,949 | B2 | 9/2015 | Lipcon |
| 10,459,849 | B1 * | 10/2019 | Shorb ................. G06F 11/2041 |
| 2005/0065973 | A1 * | 3/2005 | Steensgaard ........ G06F 12/0253 |
| 2011/0320682 | A1 * | 12/2011 | McDougall ........... G06F 12/023 711/6 |
| 2012/0239709 | A1 | 9/2012 | Burka et al. |
| 2013/0185337 | A1 * | 7/2013 | Li ....................... H04L 67/1097 707/813 |
| 2013/0318132 | A1 * | 11/2013 | Basu ................... G06F 12/0276 707/816 |
| 2015/0169444 | A1 * | 6/2015 | Kawachiya ......... G06F 12/0276 707/819 |
| 2015/0227414 | A1 | 8/2015 | Varma |
| 2015/0363113 | A1 * | 12/2015 | Rahman ................ G06F 3/0673 707/718 |
| 2017/0075856 | A1 * | 3/2017 | Suzue ................ G06F 15/17331 |
| 2017/0149890 | A1 * | 5/2017 | Shamis ................... G06F 3/067 |

OTHER PUBLICATIONS

Tony Printezis and David Detlefs. 2000. A generational mostly-concurrent garbage collector. In Proceedings of the 2nd international symposium on Memory management (ISMM '00). Association for Computing Machinery, New York, NY, USA, 143-154. (Year: 2000).*

(Continued)

*Primary Examiner* — Edward J Dudek, Jr.
*Assistant Examiner* — Ralph A Verderamo, III
(74) *Attorney, Agent, or Firm* — Workman Nydegger

(57) ABSTRACT

An arena-based memory management system is disclosed. In response to a call to reclaim memory storing a group of objects allocated in an arena, an object not in use of the group of objects allocated in the arena is collected. A live object of the plurality of objects is copied from the arena to a heap.

20 Claims, 2 Drawing Sheets

(56) References Cited

OTHER PUBLICATIONS

"Arena Storage Pool", Retrieved from: https://rosettacode.org/wiki/Arena_storage_poo, Feb. 6, 2019, 25 Pages.
"C++ Arena Allocation Guide", Retrieved from: https://developers.google.com/protocol-buffers/docs/reference/arenas, Apr. 10, 2019, 15 Pages.
"Reference Objects and Garbage Collection", Retrieved from: http://pawlan.com/monica/articles/refobjs/, Oct. 4, 2018, 9 Pages.
"International Search Report and Written Opinion Issued in PCT Application No. PCT/US20/031397", dated Sep. 21, 2020, 12 Pages.

* cited by examiner

Fig. 2
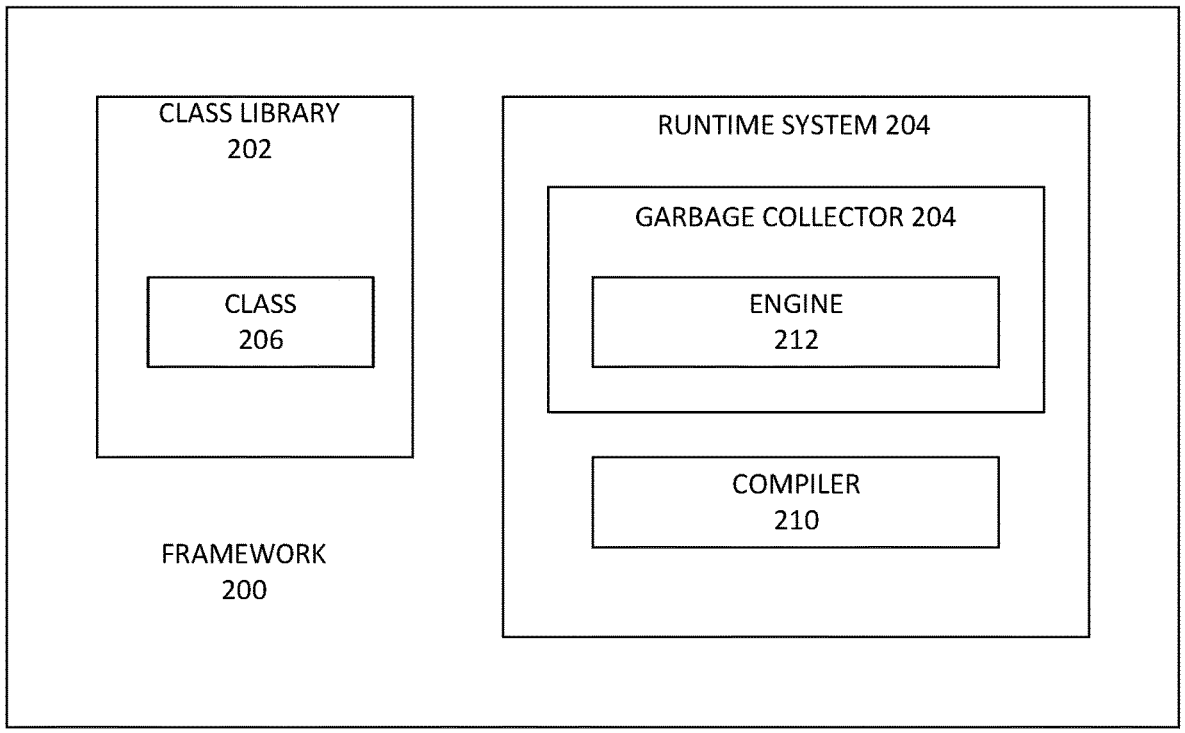
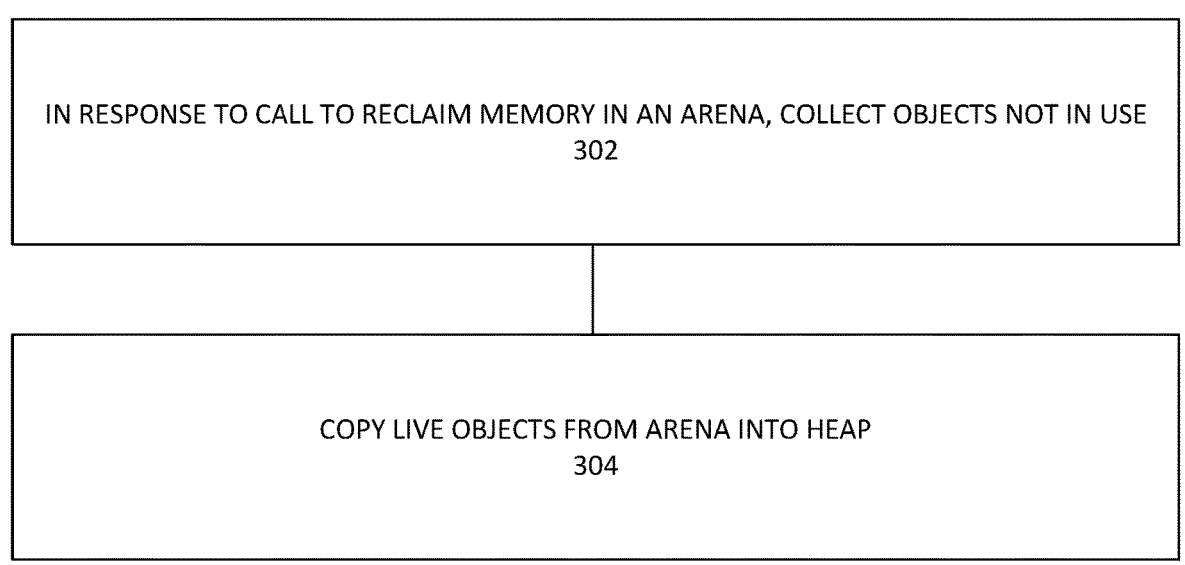
Fig. 3

ARENA-BASED MEMORY MANAGEMENT

BACKGROUND

Two common memory management techniques in computer systems include manual memory management and garbage collection. Manual memory management includes programmer-explicit allocation and deallocation of memory, such as with the malloc( ) and free( ) functions in the standard library of the C programming language or the new and delete operators in the C++ programming language. Garbage collection is a form of automatic memory management that attempts to detect objects no longer used by software applications or programs on the computer system and to recover memory occupied by the objects that are no longer used by software applications or programs running on the computing system. Another memory management technique used in unmanaged programming languages, such as C++, is arena-based memory allocation. Arena-based memory management techniques have also been referred to as region-based, zone-based, and group-based memory techniques. In an arena-based memory management system, each allocated object is placed in a program-specified arena. Memory is reclaimed by destroying the arena and freeing all the allocated objects in the arena.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Manual memory management techniques rely on the determination of a programmer as to which and whether an object can be safely deleted. If objects are deleted too early, different parts of a program might attempt to use the same memory for different purposes. If objects are deleted too late or not at all, memory leaks in the program can occur. Garbage collection techniques can solve the hazards of manual memory management techniques but can use more memory or more execution time than proper manual memory management techniques. Often, arenas are explicit in the software application and under programmer control and can increase program performance over programmer-explicit allocation and deallocation of memory, but do not address the programmer-dependent determination as to which and whether an object can be safely deleted.

The present disclosure is directed to a managed environment that may include garbage collection but allows the programmer to express groupings of objects with a common lifetime in that many of the objects in a group of objects can be collected at the determination of the programmer at the end of the common lifetime. Further, the managed environment can allow for some objects to survive the common lifetime, which addresses the issue of a programmer mistakenly deleting an object too early. A scenario in which objects may have expressed in a group having a common lifetime can include server environments in which groups of objects are allocated together to service a request. Once the request has been serviced, many, if not all, of the objects can be collected. Another scenario can include compilers or language translators. Objects are often allocated together to form an intermediate representation of a translation unit such as a module or a method. Once the translation is complete, many, if not all, of the intermediate representations can be collected. The collected objects can be deleted.

In one example, the disclosure provides for an arena-based memory management system. In response to a call to reclaim memory storing objects allocated in an arena, objects in the arena that are not in use are collected. Live objects in the arena are copied from the arena to a heap, which is served by a garbage collection.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 2 is a block diagram illustrating an example arena-based memory management framework for execution in the computing device of FIG. 1.

FIG. 3 is a block diagram illustrating an example method of the arena-based memory management framework of FIG. 2.

DESCRIPTION

Figure 1:
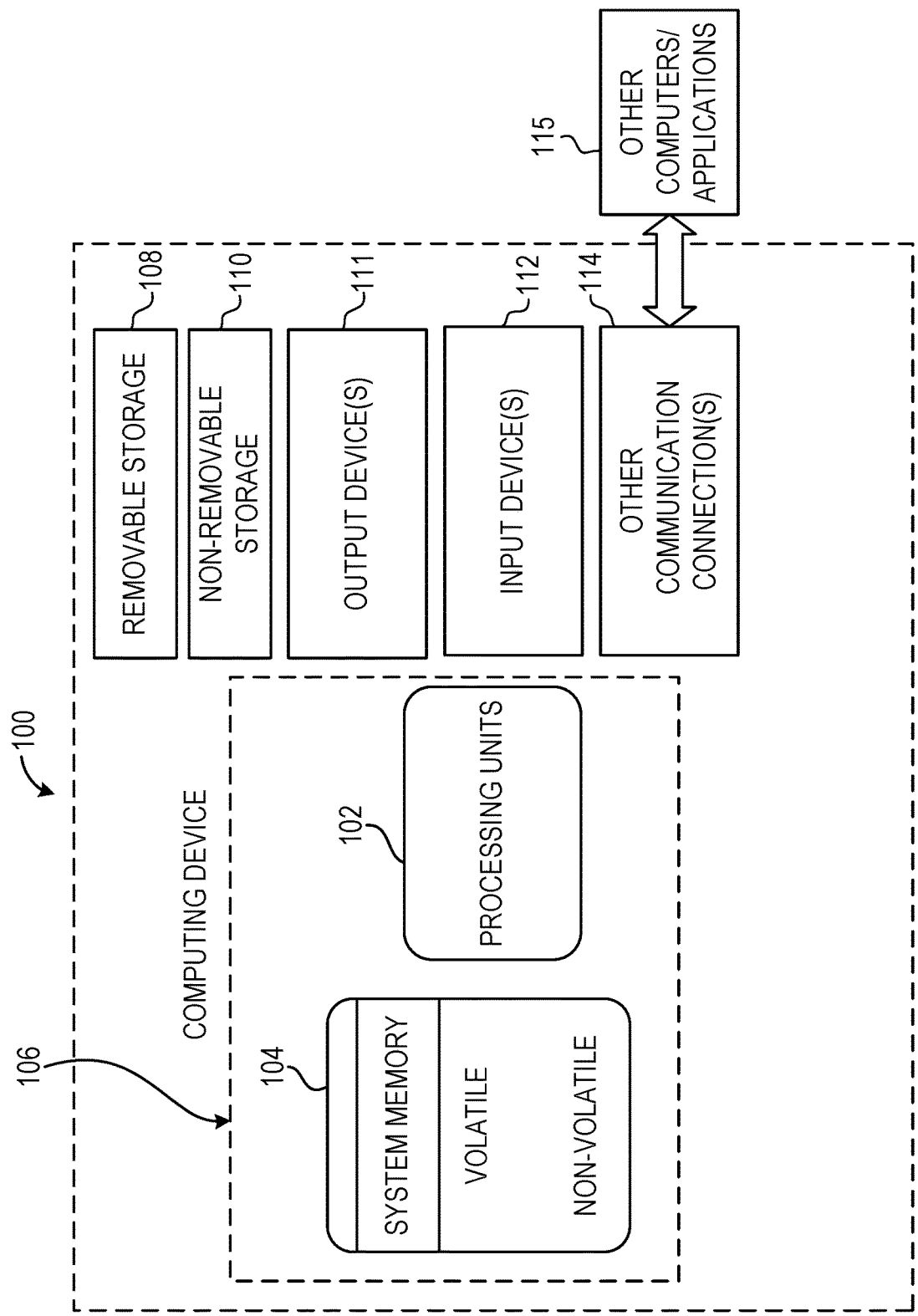
FIG. 1 is a block diagram illustrating an example of a computing device, which can be configured in a computer network to provide, for example, a cloud-computing environment.

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a concurrent garbage collection that can be stored in a computer memory and executed with a processor to be triggered based on a dynamically tunable parameter based on a previous garbage collection.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

The present disclosure relates generally to memory management techniques combining arena-based memory management systems with garbage collection used with programming languages or runtime systems in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

FIG. 2 illustrates features of an example software framework 200, which can be implemented on computing device 100. The framework 200 can be used with developer-written software applications, or programs, created in one or more framework-compatible languages for one or more platforms. Example framework 200 includes a class library 202 having a runtime library and base class library and an application engine such as a runtime system 204, virtual machine, or software container. In one example, the class library 202 includes a set of classes organized by namespace to define features available in a framework-compatible programming language. In some implementations, software applications written in a framework-compatible language as source code are compiled into a platform-neutral language, or bytecode, that can be executed in a platform-specific virtual machine installed on the platform, such as computing device 100. The runtime system 204 compiles the bytecode into machine code that is executed on the platform. The runtime system 204 can provides additional services including memory management, type safety, exception handling, garbage collection, security and thread management. Upon execution of the developer-written program, a platform-specific just-in-time compiler 210 of the runtime system 204 translates the byte code into machine code. The compiler 210 can provide a combination of ahead-of-time compilation and interpretation, and the runtime system 204 can handle late-bound data types and enforce security guarantees.

Class library 202 of the example can include one or more class or classes 206 implemented in accordance with the methods disclosed. In general, a class 206 is an extensible program-code-template, or blueprint, for creating objects, providing initial values for state, and implementations of behavior. The class is a construct that enables a developer to create custom types by grouping together variables of other types, methods and events. Class or classes 206 may include class variables, instance variables, local variables, parameters, user-defined methods, inherited states and behaviors, and interfaces. The variable can remain in memory 104 until deleted with the arena-based memory management system. At that time, the runtime system 204 via garbage collector 208 can mark the variable as eligible for garbage collection.

The class library 202 may include functions or support operators that provide for arena-based memory management in which each allocated object is assigned to an arena. In one implementation, all objects in an arena can be allocated in a single contiguous range of memory addresses in memory 104. Multiple arenas can be simultaneously active, and each range of memory addresses corresponding with each arena can be noncontiguous with other allocated arenas. In one example, each arena is implemented as a data structure, such as a linked list, of a segment of memory, such as a large block of memory, in memory 104 in which each block can serve multiple allocations. The segment maintains a pointer to the next free position in the block, and if the block is filled, a new one is allocated and added to the list. When the arena is deallocated, the next-free-position pointer is reset to the beginning of the first block, and the list of blocks can be reused for the next arena to be created. Also, when an area is deallocated, the list of blocks can be appended to a global freelist from which other arenas may later allocate new blocks. Many operations may be performed to construct list, a single operation can deallocate the arena without having to traverse the list. The operations for allocation and deallocation can be implemented with simple functions in the library for programmer use. An arena-base memory management system includes the features and mechanism assign allocated objects to an arena and to deallocate the objects at once from the arena in this manner.

The runtime system 204 can allocate a segment of memory in memory 104 for arenas to store and manage objects. In one example, the segment of memory is a heap. (The "heap" in this disclosure is distinguishable from a native heap in the operating system.) In one example, there can be a heap for each process, and threads in the process allocate memory for objects on the same heap. In another example, the heap can be an accumulation of a large object heap, such as a heap that includes objects over a selected threshold in size, and a small object heap. The heap can include any number of noncontiguous chunks of virtual memory, each including live blocks with objects interspersed with regions of free memory, or free space. The runtime system 204 can maintain a free list data structure, or physical free list, that indexes all of the free memory that has been allocated.

The runtime system 204 can include a garbage collector 208 to automatically manage the allocation and release of memory on the heap, or managed heap, for a software application. A garbage collector 208 attempts to detect objects no longer used by software applications on the computer system and to recover memory occupied by the objects that are no longer used by software applications running on the computing system. In one example, garbage collector 208 can provide a tracing garbage collection to determine which objects should be deallocated by tracing which objects are reachable by a chain of references from certain root objects, and collecting the rest of the objects, rather then by reference counting. The garbage collector 208 includes an optimizing engine 212 to determine the preferred time or occasion to perform a collection. The garbage collector 208 checks for objects in the segment of memory that are no longer being used by the application and performs the operations to reclaim the memory. Garbage collection can occur in response to a heap-related parameter such as when the system has low physical memory or if the memory used by allocated objects on the segment of memory surpasses an acceptable threshold.

In one example, the heap can be a generational heap. The heap can be organized into multiple generations to tackle long-lived and short-lived objects. Garbage collection primarily occurs with the reclamation of short-lived objects that typically occupy a small part of the heap. One example includes three generations of objects on the heap including a generation 0, generation 1, and generation 2. Generation 0 is the youngest generation and contains short-lived objects such as a temporary variable. Garbage collection occurs most frequently in this generation. □In one example, newly allocated objects form a new generation of objects and are implicitly generation 0 collections, unless they are large objects, in which case they go on the large object heap in a generation 2 collection. Many objects are reclaimed for garbage collection in generation 0 and do not survive to the next generation. Generation 1 includes short-lived objects and can serves as a buffer between short-lived objects and long-lived objects. Some example garbage collectors do not include a generation 1 heap and only include heaps for short-lived and long-lived objects. Additionally, one or more generations of short-lived objects can be known as ephemeral generations. Generation 2 includes long-lived objects. An example of a long-lived object is an object in a server application that contains static data that is live for the duration of the process. Garbage collections occur on specific generations as conditions warrant. Collecting a generation means collecting objects in that generation and all its younger generations. A generation 2 garbage collection is typically a full garbage collection because it reclaims all objects in all generations of the managed heap. Objects that are not reclaimed in a garbage collection are known as survivors and can be promoted to the next generation. For example, objects that survive a generation 0 garbage collection are promoted to generation 1, objects that survive a generation 1 garbage collection are promoted to generation 2, and objects that survive a generation 2 garbage collection remain in generation 2.

Before a garbage collection starts, or is triggered, the managed threads can be suspended except for the thread that triggered the garbage collection. The garbage collector 208 can determine whether an object is live via information such as stack variables provided by a just-in-time compiler and stack walker, handles that point to managed objects and that can be allocated by user code or by the runtime, and from static objects in application domains that could be referencing other objects. Each application domain tracks its static objects. In one example, garbage collection can occur in a set of phases including marking phase that finds and creates a list of all live objects, a relocating phase that updates the references to the objects that will be compacted, and a compacting phase that reclaims the space occupied by the dead objects and compacts the surviving objects. The compacting phase moves objects that have survived a garbage collection toward the older end of the segment of memory. In one example, garbage collector 208 can be a mark and sweep collector that can find and create a list of all live objects, update references to objects that occupy memory to be compacted, reclaim address space occupied by dead objects, and compact surviving objects.

FIG. 3 illustrates an example method 300 for use with an arena-based memory management system, such as the framework 200 that supports the use of arenas for memory management and having garbage collector 208. In the example, arenas are created in a segment of memory, such as memory 104, that is separate from the heap served by garbage collection. In response to a call to reclaim memory storing a plurality of objects allocated in an arena, objects not in use in the arena are collected at 302. In one example, the call to reclaim memory is delayed until cleanup of the arena is triggered based on a selected criterion. This can be in contrast with a typical arena collection, which reclaims the memory in direct response to the call. The selected criterion or criteria can include a typical garbage collection trigger. In the case of the method 300, however, the cleanup of the arena does not occur until after the call to reclaim memory of the arena. This can be in contrast to a typical garbage collection, which can occur before a programmed deallocation of memory. The arena can be destroyed with a cleanup routine, or cleanup task, that is directed at the arena.

Also, in response to the call to reclaim memory, a live object of the plurality of objects is preserved by copying the live object to a heap at 304. In the example, the heap is service with garbage collection. In one example, the garbage collection is a tracing garbage collection and detects live objects that have been set to be freed. The call to reclaim memory, in one example, can relocate the live object outside of the arena, such as in a section of the managed heap before the arena is deallocated. The typical implementation of arenas is unsafe as an arena can be deleted even if other arenas have accessible pointers to objects in the arena to be deleted. Rather than apply reference counters to prevent the arena from being deleted, the live object is relocated and the arena is deleted. Pointers to live objects relocated from the arena to the heap are updated. In one example, after the arena no longer includes live objects or pointers to the arena, the arena can be deleted. Accordingly, method 300 deletes the arena after the call to reclaim the memory at an efficient point in the program, which may occur after the call to reclaim memory, and preserves live objects in the heap that may inadvertently remain in the arena to be deleted. The live object relocated to the heap can be garbage collected after it not in use. The portion of memory used by the reclaimed arena can be used for other arenas.

In one example, the framework 200 can allow for both garbage collection and arena-based memory management to co-exist in the same application by using separate memory segments for garbage collected and arena-based managed objects. The class library 202 can provide for functions and statements to implement arena based memory management in programs addressed at objects having a common lifetime. In one example, the class library 202 can include functions to allocate memory into an arena as well as to allocate objects in the arena.

In one example, an arena can be created in a program with a statement such as:
    Arena abc=new Arena( )
Objects, such as objects having a common lifetime, can be subsequently allocated to this Arena. At a part of the program when many, if not all, of the objects in the Arena are no longer used, i.e., the expiration of the common lifetime, the Arena can be collected in the program with a Dispose method in a statement such as
    abc.Dispose( )
The runtime system 204 will determine which objects allocated in the Arena, if any, are still alive, or in use, and will copy these objects out to the garbage collection heap. In one example, the runtime system 204 may wait until an opportune time to copy the surviving objects to the heap. The class library 202 can also provide a mechanism to group a section of the program to create and collect an Arena for objects having a common lifetime in the program with a statement such as:

```
using (Arena abc =new Arena( ))
{
    //...program statements using Arena abc
}
```

Directing allocations to an Arena can be termed "activating an Arena," An Activate function can cause a thread to allocate in the Arena with a statement such as:
    ArenaThread xyz=abc.Activate( )
The Activate function returns an ArenaThread object. Allocation can be directed back to the heap by call the Dispose function on the ArenaThread object such as:
    xyz.Dispose( )
The class library can also provide a mechanism to combine both operations with a using statement such as:

```
using (abc.Activate( ))
{
    //...allocations here go into Arena abc
}
```

An example implementation can include a stack of allocators attached to each thread of execution. In response to execution of the Activate function, an allocator associated the Arena is pushed on the stack of allocators. In response to an ArenaThread object being disposed with the Dispose function, the associated allocator is popped from the stack of allocators. For object allocation, the topmost allocator on the stack provided the memory. The use of multiple threads allocated in the same Arena is contemplated and may be used in the scenario of the server environment in which multiple threads collaborate to service a request.

Framework 200 can include support for asynchronous programming in which a task may be started by a first thread, put on hold while waiting, and then continued in a second thread. In cases in which the task is associated with an Arena, the first and second threads are allocated in the same Arena. Framework 200 includes provisions to automatically allocate the threads of a task into the same Arena.

Allocations are directed to an Arena in a way that implies other code called by the logic using the Arena, or arena-aware logic, will allocate memory in the Arena without having to be modified or recompiled. In this configuration, existing code can be used with modification to work with arena-aware logic. In circumstances in which it is not desirable for the existing code to work with the Arena, such as certain library routines in which allocation are known not to be associated with any Arena, the garbage collection heap can be activated with a statement such as:

```
using (Arena.GCHeap.Activate( ))
{
    //...allocations here go into heap, not Arena
}
```

A reference counting scheme can be implemented to address circumstance in which an Arena is disposed but is still being used for allocation. In an example of a reference counting scheme, Arenas are created with a reference count of x, such as 1. For each instance an allocator for an arena is pushed on an allocator stack of a thread, the reference count of the arena is incremented. Calling the Dispose function on an Arena decrements the reference count. Also, calling the Dispose function on an ArenaThread object pops the allocator stack on the current thread and decrements the reference count of the Arena associated with the allocator. If the reference count on an Arena drops to x−1, or zero in the example, the Arena becomes collectable, i.e., the system will at some point in the future copy out all live objects, or objects that are still reachable, and then destroy the Arena.

In one example, the framework 200 can impose no restrictions on where pointers to objects in Arenas may be stored. Thus, pointers to objects in Arenas may be encountered in local variables, in objects in the same Arena, in a different Arena, or in the heap. Similarly, objects in Arenas may freely point at regular garbage collection objects or objects in different Arenas. To determine which objects in a collectable Arena are still reachable and thus are to be preserved, the thread stacks and their associated local variables can be examined as well as heap objects. To simply this examination, the runtime system 202 can take a note of cases in which references between different Arenas, or between an Arena and the heap are created. In one example, references from the heap to Arenas set bytes in the card table already used by the heap, to track cross-generation pointers, and the reference are also noted in a per thread reference list. References from Arenas to the heap set a bit in a side table if the reference is to ephemeral garbage collection memory, i.e. to garbage collection generations 0 or 1. Also, references between Arenas also set a bit in a side table and are noted in a per thread reference list.

When the Arena becomes collectable—such as when the reference count on an Arena drops to x−1, or zero, in the reference count example—the runtime system 202 will copy the objects that are still reachable out of the Arena to the heap and be served by garbage collector 208. The runtime system 202 may include an Arena collection and an Arena collection with garbage collection. In an Arena collection, live objects, or objects reachable objects, in collectable arenas are copied out to the heap. In one example, objects in the heap are not considered for collection except if objects the heap have pointers to objects in a collectable Arena. Arena collection is relatively fast but can be relatively conservative in that a non-reachable object in the heap may contain a pointer to an object in an Arena. The object in the Arena will then be considered reachable, even though it's only reachable via an object that is itself not reachable. This may cause unreachable objects in the Arena to survive. Arena collection with garbage allows the runtime system 202 to compute reachability with relatively greater precision, but Arena collection with garbage collection is relatively more expensive than an Arena collection.

In one example, the runtime system 202 can automatically determine whether to apply an Arena collection or an Arena collection with garbage collection. For example, the runtime system 202 may evaluated and base the determination on criteria including the amount of memory used on the heap and the amount used in the reference list. A program can trigger a garbage collection by calling the GC.Collect( ) function, and, in one example, the function can cause an Arena collection with garbage collection to occur.

References to objects in Arenas during an Arena collection can be determined from criteria including local variables in the user program, a reference list that was built when references from the heap to the Arena or between different Arenas were created, finalizable objects in a collectable Arenas, and garbage collection handles. A determination can be made as to whether the object pointed at is in a collectable Arena. If the object pointed at is in a collectable Arena, the object is copied to the heap and served by the garbage collector 208. References to this object, if any, can be updated to point to the new location.

Determining whether the object pointed at is in a collectable Arena proceeds can include a determination whether the pointer points into the memory range reserved for Arenas. If the pointer points into the memory range reserved for Arenas, the containing block number in Arena memory is computed. In one example, Arena memory is subdivided into 1 MB (1 MiB) blocks, and determining the block number includes subtracting the base address of the Arena memory range and dividing the resulting offset by $2^{20}$, or 1 MiB. The block number is used to index into a lookup table containing a number identifying the containing Arena for each block. A determination can be made as to whether the containing Arena has in fact reference count 0.

Objects referenced from the copied object may be in collectable Arenas, and can also be copied into the heap. This includes objects referenced from objects reference from the copied object, and so on.

In the scenario including the server environment, several threads of execution may collaborate in the cleanup task, and the runtime system 202 can provide a locking scheme and work coordination between cleanup thread. The locking scheme can help safeguard that a given Arena object will be copied by one cleanup thread, and that cleanup threads will see a consistent new location for the object. This also makes sure that if there are several references to an object, they will all be updated to the same new location. As a special case, several threads may attempt to update the same reference at the same time, which is acceptable because all threads will write the same value. Work coordination between the cleanup threads can keep all cleanup threads busy and thus minimize or reduce the time of the cleanup task. Work coordination can be performed by enumerating shared data structures (Arenas, Arena blocks, reference lists) efficiently across multiple cleanup threads. As the cleanup process is a multi-phase process, work coordination helps to prevent threads from entering the next phase before all threads have completed the current phase. For instance, before destroying an Arena we need to make sure all cleanup threads have indeed finished evacuating objects from it.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of controlling an arena-based memory management system, the method comprising:

in response to a program statement of a program running in a framework, creating an arena in memory wherein the framework allocates a plurality of objects into the arena in memory, the arena reclaimable after a programmed deallocation, the memory including the arena and a segment for collected managed objects automatically allocated by the framework; and in response to a call from the program to reclaim memory storing a plurality of objects allocated in the arena, deallocating the arena, copying a live object of the plurality of objects from the arena to the segment for collected managed objects prior to deallocating the arena, and collecting with the framework an object of the plurality of objects not in use in the arena.

2. The method of claim 1 comprising disposing the arena in response to the call.

3. The method of claim 1 wherein the segment for collected managed objects includes a heap, and the heap is served by a garbage collection.

4. The method of claim 3 wherein the garbage collection is a generational garbage collection.

5. The method of claim 1 wherein the call to reclaim memory includes a dispose method.

6. The method of claim 1 wherein the call to reclaim memory includes reclaiming the arena.

7. The method of claim 6 wherein the call to reclaim memory further includes a garbage collection.

8. The method of claim 1 wherein the copying a live object further includes copying objects referenced from the live object.

9. The method of claim 1 comprising using reference counting if the arena is being used for allocation.

10. The method of claim 1 wherein the segment for collected managed objects includes a heap, and the plurality of objects point to objects in the heap.

11. An arena-based memory management system, comprising:
a memory device to store a set of instructions; and
a processor to execute the set of instructions to:
in response to a program statement of a program running in a framework, create an arena in memory, allocate with the framework a plurality of objects into the arena in memory, the arena reclaimable after a programmed deallocation, the memory including the arena and a segment for collected managed objects automatically allocated by the framework; and in response to a call from the program to reclaim memory storing a plurality of objects allocated in the arena, collect with the framework an object of the plurality of objects not in use in the arena, deallocate the arena, and copy a live object of the plurality of objects from the arena to the segment for collected managed objects prior to deallocating the arena.

12. The system of claim 11 wherein the segment for collected managed objects is served by a generational garbage collector.

13. The system of claim 11 wherein the segment for collected managed objects includes a heap, and objects in the heap having pointers to the object not in use in the arena are collected in the response to the call to reclaim memory.

14. The system of claim 11 wherein the response to a call to reclaim memory includes a garbage collection.

15. The system of claim 11 wherein multiple threads allocate in the arena.

16. The system of claim 15 wherein each thread includes a stack of allocators.

17. A computer readable device to store computer readable instructions to control a processor to control an arena-based memory, the instructions comprising:
in response to a program statement of a program running in a framework, create an arena in memory, allocate with the framework a plurality of objects into an arena in memory, the arena reclaimable after a programmed deallocation, the memory including the arena and a segment for collected managed objects, automatically allocated by the framework; and in response to a call from the program to reclaim memory storing a plurality of objects allocated in the arena, collect with the framework an object of the plurality of objects not in use in the arena, deallocate the arena, and copy a live object of the plurality of objects from the arena to the segment for collected managed objects prior to deallocating the arena.

18. The computer readable device of claim 17 comprising instructions for a dispose method to reclaim memory.

19. The computer readable device of claim 17 comprising instructions for an activate method to allocate in the arena.

20. The computer readable device of claim 17 wherein the instructions to collect the object not in use in the arena includes instruction to perform a cleanup task.

* * * * *